United States Patent
Hendrickson et al.

(10) Patent No.: US 7,483,342 B2
(45) Date of Patent: Jan. 27, 2009

(54) METHOD AND SYSTEM FOR RECONDITIONING OPTICAL STORAGE MEDIA TO WRITE UPDATED INFORMATION

(75) Inventors: Dean Hendrickson, Round Rock, TX (US); Hong-Jing (James) Lo, Austin, TX (US); Christiaan Steenbergen, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 599 days.

(21) Appl. No.: 10/376,807

(22) Filed: Feb. 28, 2003

(65) Prior Publication Data

US 2004/0170095 A1  Sep. 2, 2004

(51) Int. Cl.
*G11B 7/00* (2006.01)

(52) U.S. Cl. ............... 369/30.23; 369/47.13; 369/47.14

(58) Field of Classification Search ............. 369/47.13, 369/47.14, 47.28, 47.3, 47.32, 59.25
See application file for complete search history.

(56) References Cited

U.S. PATENT DOCUMENTS

| 6,154,437 | A | 11/2000 | Utsunomiya et al. | 369/275.2 |
| 6,407,976 | B2 | 6/2002 | Nagara et al. | 369/116 |
| 6,445,669 | B1 | 9/2002 | Hattori et al. | 369/116 |
| 6,469,968 | B1 | 10/2002 | Van Den Enden et al. | 369/59.12 |
| 6,782,487 | B2 * | 8/2004 | Gotoh et al. | 714/7 |
| 2002/0031073 | A1 * | 3/2002 | Miyamoto et al. | 369/59.25 |
| 2002/0172123 | A1 * | 11/2002 | Ohmi | 369/59.25 |
| 2003/0103288 | A1 * | 6/2003 | Suzuki | 360/66 |
| 2003/0210489 | A1 * | 11/2003 | Hirakata et al. | 360/57 |
| 2004/0013059 | A1 * | 1/2004 | Sasaki et al. | 369/47.12 |

OTHER PUBLICATIONS

U.S. Appl. No. 10/361,284 entitled "Method and System for Time Compensation of Re-Writable Optical Media Write Parameters" naming Christiann Steenbergen as inventor and filed Feb. 10, 2003.
U.S. Appl. No. 10/376,807 entitled "Method and System for Reconditioning Optical Storage Media to Write Updated Information" naming Dean Hendrickson, Hong-Jing (James) Lo. And Christiann Steenbergen as inventors and filed Feb. 28, 2003.

* cited by examiner

*Primary Examiner*—Tan X Dinh
*Assistant Examiner*—Lixi Chow
(74) *Attorney, Agent, or Firm*—Hamilton & Terrile, LLP; Robert W. Holland

(57) ABSTRACT

An optical storage reconditioning module extends the life of re-writable optical medium, such as DVD+RW optical storage disks, by writing random information to recondition commonly used portions of the optical medium before re-writing information to those portions of the optical medium. For instance, a stored file system structure of an optical medium, such as a Universal Disk Format (UDF) random writable file system, is updated by reading to a buffer the structure from the optical medium, over writing the structure with random information recondition transitions between data points of the structure, updating the file system structure in the buffer and writing the updated file system structure over the random information.

5 Claims, 2 Drawing Sheets

METHOD AND SYSTEM FOR RECONDITIONING OPTICAL STORAGE MEDIA TO WRITE UPDATED INFORMATION

BACKGROUND OF THE INVENTION

1. Field of the Invention

The present invention relates in general to the field of storing information on optical medium, and more particularly to a method and system for reconditioning optical media to write updated information.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often run applications that produce large quantities of data. One option available for storing large quantities of data on high capacity removable media is writing the data to optical disks such as compact disks (CDs) or digital versatile disks (DVDs). Re-writable optical disks, such as DVD+RW and CD-RW disks, offer the flexibility of re-using optical medium that has already had information stored on it. Re-writable optical medium have greater storage capabilities than magnetic floppy medium, and are adoptable to have similar functionality such as the embedding defect management and random writable file system capabilities through optical disk drives. Re-writable optical disk drives burn data onto re-writable disks with lasers that alter the characteristics of the disk. However, after a number of data writes, optical disk medium wear-out and are no longer able to accept data writes. A typical optical medium life expectancy is for 1000 re-writes before failure of the optical medium is expected.

One difficulty with re-writable optical medium is that re-writes are not typically distributed evenly across the entire disk so that some portions of a disk fail before other portions. For instance, in a Universal Disk Format (UDF) formatted random re-writable optical medium users often perceive a shortened life expectancy when certain disk areas, such as file system structures, experience a greater number of writes than other disk areas. As an example, the Universal Disk Format (UDF) specification defines file system structures such as the logical volume descriptor blocks, sparing tables for defect management and logical volume integrity descriptor blocks, to reside in the same logical block addresses. These file system structure areas are updated with each data write, resulting in a greater frequency of re-writes to the file system structure areas compared with data storage areas of the optical medium. The greater number of re-writes to the file system structure area leads to optical medium failure even though data storage areas, which have not experienced as frequent a number of re-writes, are able to support additional re-writes. In addition, repeated re-writes of the same information to a selected area of the optical medium can make the area unusable after just a few writes. For instance, repeated writing of a data point in the same position, as often occurs when a file structure is updated, alters the physical characteristics of the optical medium at the data point so that subsequent writes are ineffective. Even where the value of the data point changes with different writes, the repeated use of the same location often leads rapidly to an unusable medium at that location due to changing physical characteristics of the optical medium across the data point location, such as from varying melt and anneal conditions at the border of a data point location compared with the inner portion of the data point location.

SUMMARY OF THE INVENTION

Therefore a need has arisen for a method and system which reconditions an optical medium between information writes to extend the usable life of the re-writable optical medium.

A further need exists for a method and system which reconditions file system structures of random writable formatted optical mediums to reduce the occurrence of premature wear-out from repeat writes of similar data points.

In accordance with the present invention, a method and system are provided which substantially reduce the disadvantages and problems associated with previous methods and systems for updating information written to a re-writable optical medium. Random information writes are performed on a selected area of the optical medium to recondition the optical medium before information is written to the selected area. Information updates to information written to a selected area are sent for writing to the selected area and are written over the random information. File system structures of an optical medium are updated by buffering the stored structure, writing random information over the stored file structure, updating the buffered structure with changes from the updates, and then writing the updated structure over the random information. Writing random information reduces wear-out of the optical medium material by overwriting data point transitions.

More specifically, an optical storage device includes a reconditioning module that reconditions selected commonly written areas of an optical medium, such as a file structure, by writing random information over a selected area before writing updated information to the selected area. The random information uses a pattern that overwrites transitions of data points to recondition the optical medium. The update of information written to a selected area of the optical medium is managed by an optical storage update module that buffers information data units read from an optical medium file structure, writes the random information over the area of the optical medium associated with the file structure, updates the buffered file structure information with the updated file structure information and then writes the updated file structure information from the buffer to the file structure area of the optical medium. For instance, file structure updates are written to a DVD+RW disk UDF formatted for use as a random writable medium by reconditioning the disk with a random information write performed over existing store file structures before the write of the updated file structure, such as with file structure updates resulting from file additions, removals, modifications, sector sparing, formatting or other write operations.

The present invention provides a number of important technical advantages. One example of an important technical advantage is that data writes on a reconditioned optical medium extend the usable life of the re-writable optical medium. Updated information sent to a re-writable optical disk for storage in frequently written disk areas are performed with a recondition operation that overwrite data point transitions with random data. The writing over of data point transitions prevents the repeated re-writing of the same data points at a location of an optical medium from making the optical medium locally unusable at the border of a data point even though the optical medium within the data remains usable.

Another example of an important technical advantage of the present invention is that file system structures of a re-writable optical medium are updated with reconditioning of the area of the optical medium that stores the file system structure at re-writes of updated file system structures. For UDF formatted re-writable optical medium, reconditioning of the optical medium before updates of file system structures improves the optical medium's lifespan by reducing the risk that transitions between repeatedly written data points will not prematurely lose the physical characteristics needed to write information. The impact on data write performance is minimized by applying reconditioning to selected areas of an optical medium, such as file system structures, that repeatedly write substantially similar data points and by applying normal disk management to data portions of the optical medium, such as by sparing packets that fail due to wear-out.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A re-writable optical medium's lifespan is effectively extended by reconditioning selected areas of the optical medium for re-writing of data to those areas where re-written information does not substantially change existing stored information. A reconditioning module of an optical storage device reconditions the selected area, such as a file system structure, by writing random information to the selected area before writing updated file structure information generated by an information handling system. For purposes of this application, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
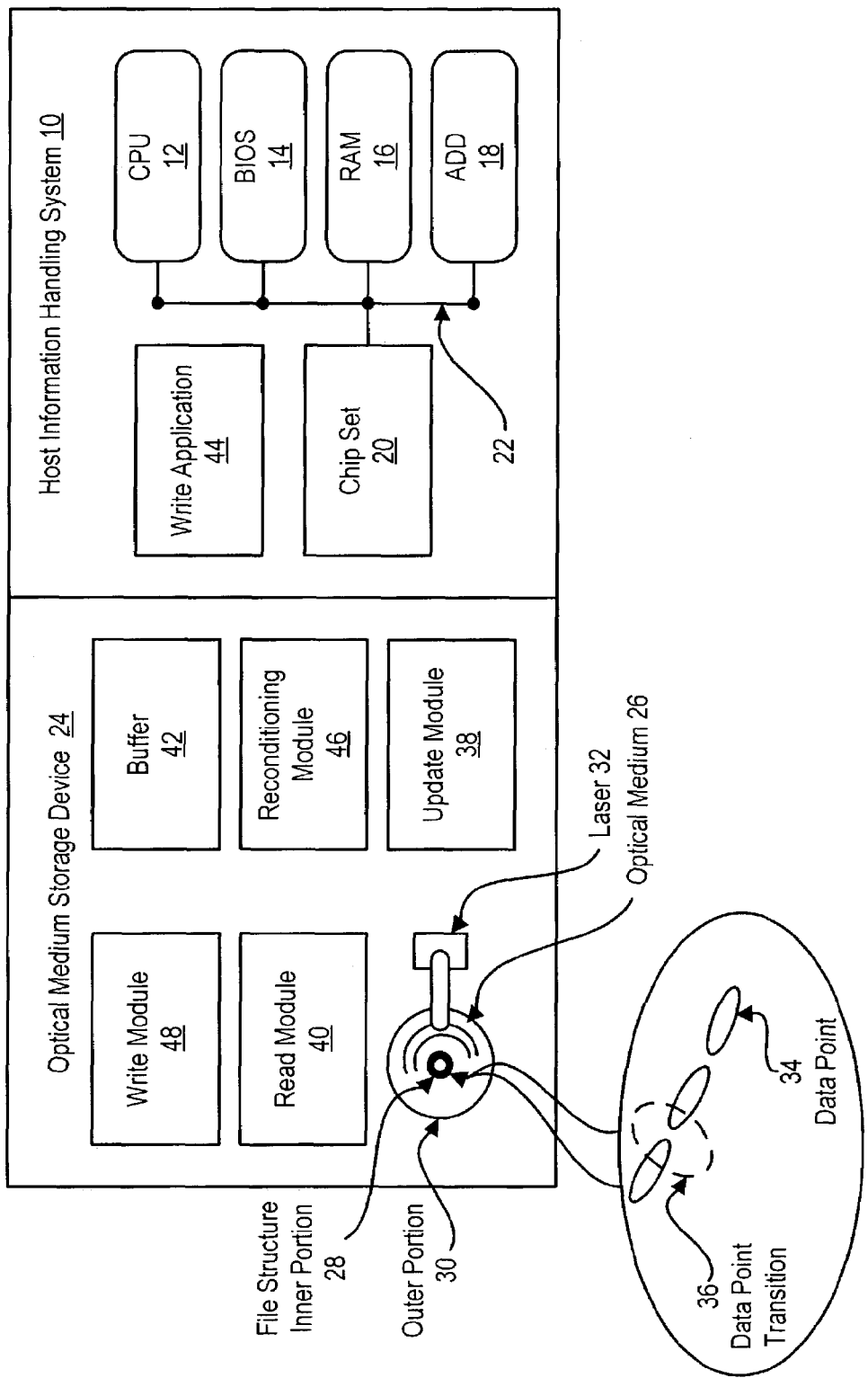
FIG. 1 depicts a block diagram of an information handling system operable to recondition optical medium file structure updates.

Referring now to FIG. 1, a block diagram depicts an information handling system 10 operable to write information to a re-writable optical medium with random writable file structure updates. Information handling system 10 generates information through operations performed with a variety of components, such as CPU 12, BIOS 14, RAM 16, a hard disk drive 18 and a chip set 20, and communicates the generated information through a bus 22 for storage by an optical storage device 24 on a re-writable optical medium 26. For instance, re-writable optical medium 26 is a DVD+RW disk formatted for use as a UDF random writable medium having an inner portion 28 that stores a file system structure for information stored in an outer portion 30. The UDF specification defines logical block addresses that store the file system structure, such as the logical volume descriptor blocks, sparing tables for defect management and logical volume integrity descriptor blocks, in inner portion 28. When information handling system 10 writes information to outer portion 30 of optical medium 26, the file structure in inner portion 28 is updated. For example, the file structure is updated when files are added, removed or modified, when sectors are spared, when the optical storage device updates background formatting status, and when other similar operations are performed, exposing inner portion 28 to a higher frequency of re-writes than outer portion 30.

Information written to UDF formatted optical media, including the file system structure, is generally written in a fixed packet format of 16 sectors per packet. A laser 32 burns information into data points 34 by melting the optical medium under varying conditions that alter the reflective characteristics of the optical medium after it cools and anneals. The information is read by illuminating data points 34 with laser 32 at a lower power and measuring the reflection of the laser from the data point. Typically, changes in data values are read at the transition 36 of one data point to another. Repeated re-writes of data points 34 conditions the optical medium material so that the melt and anneal characteristics change to become unusable, especially in the border of the data points 34 which corresponds with the transition 36 used to read information. Updates to file structures, which are generally created with each write of information by host 10 to optical medium 26, tend to have non-substantial changes to file structure data units so that the data points written to the file structure area 28 are often repeated re-writes of the same data points 34 at the same location. For example, adding a defect entry to a UDF sparing table results substantially only in changes to the file structure data unit locations of the optical medium that are changed by the added entry and does not change the entire sparing table. Thus, an update to a sparing table results in a re-write of the same data units at the same location with the exception of the data points changed by the update to the sparing table. For some optical medium materials a relatively small number of such re-writes, of the order 50, leads to failure.

An update module 38 effectively extends the lifespan of optical storage medium 26 by managing re-writes of data points of selected areas, such as data points of file structure information that is not changed by a file structure update received from a host information handling system. When an update to information stored on optical medium 26 is received by optical storage device 24, update module 38 interfaces with read module 40 to read the file structure information stored in the selected area on optical medium 26, such as file structure area 28, with laser 32 and stores the read information in a buffer 42 or, alternatively in a write application 44 associated with host 10. Update module 38 reconditions the selected area of optical medium 26 with a reconditioning module 46 that writes random information to the selected area to overwrite the information stored in the selected area. For instance, for a file structure update a random information pattern overwrites the file structure area to have data point transitions 36 that differ from existing transitions. Update module 38 updates the information in buffer 34 to include the changes to the existing information and interfaces with a write module 48 to write the updated information in the selected area over the random information. Update module 38 may recondition a variety of selected areas of optical medium 26 that are subject to repeated re-writes of data points with the reconditioned areas defined as a variety of sizes, such as entire files or individual packets. However, limiting reconditioning to critical locations of an optical storage medium that contain file system structures provides a longer perceived life expectancy for the optical storage medium by reducing packet wear-out for the critical locations without substantially impacting write performance. For instance, for UDF formatted media, packet wear-out on a file system structure will render the media unusable whereas packet wear-out on a user data packet will only result in a sparing of the packet. Reconditioning of a file system structure is performed so that random data patterns written to recondition the optical medium are different for each sector at each reconditioning.

Figure 2:
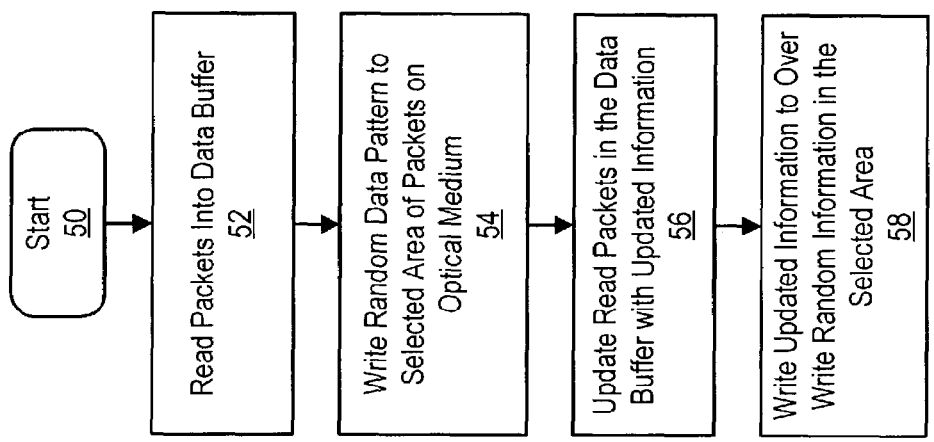
FIG. 2 illustrates the process for reconditioning of and writing to file structure areas of an optical medium.

Referring now to FIG. 2, a flow diagram depicts a process for reconditioning an optical medium to update information written on the optical medium, such as writing updated file structure information to a UDF formatted random writable DVD+RW disk. The process begins at step 50 with the sending from a host information handling system of updated information, such as updated file structure information, to be written to a selected area of an optical disk drive. At step 52, the optical disk drive reads the information stored on the optical medium, such as a file structure information packet, to an optical disk drive buffer or other storage location. At step 54, the optical drive writes a random data pattern to the area of the optical medium from which the packet was read. For areas that are written plural times, the random data pattern is a different data pattern written to each sector each time the random write is performed to a sector. At step 56, the optical drive, or alternatively the write application of the host information handling system, compares the updated information with the stored information to identify and update the packet or packets that are different. At step 58, the optical disk drive writes the updated information to the optical storage medium over the randomly written information in the selected area. For instance, the file structure on the optical storage medium is updated with the file structure information changes by writing updated packets to selected areas of the optical storage medium that are first reconditioned with a write of random information to the selected area.

Although the present invention has been described in detail, it should be understood that various changes, substitutions and alterations can be made hereto without departing from the spirit and scope of the invention as defined by the appended claims.

What is claimed is:

1. A method for storing information on an optical storage medium, the method comprising:
   storing information on a predetermined area of the optical storage medium;
   generating updated information for storage on the predetermined area of the optical storage medium;
   buffering the stored information from the predetermined area into buffer memory;
   writing random information to the predetermined area;
   updating the stored information in the buffer with the updated information; and
   writing the updated information to the predetermined area over the random information.

2. The method of claim 1 wherein the updated information comprises file system structure information.

3. The method of claim 2 wherein the stored information comprises a sparing table having plural defect entries and the updated information comprises a defect entry added to the sparing table.

4. A method for storing information on an optical storage medium, the method comprising:
   storing information on a predetermined area of the optical storage medium;
   generating plural information updates for storage on the predetermined area of the optical storage medium;
   writing the information updates to the predetermined area;
   writing random information to the predetermined area before each writing of an information update, each write of random information writing substantially different data patterns.

5. An optical storage device for performing reconditioned writes to an optical medium of updated information generated by an information handling system host, the optical storage device comprising:
   a laser operable to illuminate the optical medium to write information as data points to the optical medium or read information from transitions between data points of the optical medium;
   a write module interfaced with the laser and operable to command the laser to illuminate for writing information to the optical medium; and
   a reconditioning module operable to recondition selected portions of the optical medium by writing random information to the selected portions before writing the updated information to the selected portions over the random information;
   a read module interfaced with the laser and operable to command the laser to illuminate the optical medium to read information;
   a buffer interfaced with the read module and operable to store information read from the optical medium; and
   an update module interfaced with the read module, write module and reconditioning module, the update module operable to update information stored on the selected portion of the optical medium by reading the stored information to the buffer, writing random information to the selected information, updating the information stored in the buffer and writing the updated information to the selected portion of the optical medium.

* * * * *